(12) United States Patent
Yu

(10) Patent No.: US 8,098,989 B2
(45) Date of Patent: Jan. 17, 2012

(54) ALL-OPTICAL WAVELENGTH CONVERSION FOR A POLARIZATION MULTIPLEXING OPTICAL SIGNAL

(75) Inventor: Jianjun Yu, Princeton, NJ (US)

(73) Assignee: NEC Laboratories America, Inc., Princeotn, NJ (US)

( * ) Notice: Subject to any disclaimer, the term of this patent is extended or adjusted under 35 U.S.C. 154(b) by 354 days.

(21) Appl. No.: 12/437,706

(22) Filed: May 8, 2009

(65) Prior Publication Data

US 2009/0279891 A1   Nov. 12, 2009

Related U.S. Application Data

(60) Provisional application No. 61/051,550, filed on May 8, 2008.

(51) Int. Cl.
*H04J 14/06* (2006.01)
*H04B 10/04* (2006.01)
(52) U.S. Cl. ............... 398/65; 398/183; 398/184
(58) Field of Classification Search ............ 398/65, 398/152, 183, 184, 187
See application file for complete search history.

(56) References Cited

U.S. PATENT DOCUMENTS 7,672,598 B1 *  3/2010 Campillo ............ 398/184

* cited by examiner

*Primary Examiner* — Jack Dinh
(74) *Attorney, Agent, or Firm* — Joseph Kolodka

(57) ABSTRACT

An apparatus includes a first laser source for providing a first lightwave; a first optical coupler that is polarization maintaining for dividing the first lightwave into first and second optical carrier lightwaves; first and second modulators for modulating respective ones of the first and second carrier lightwaves with information; a polarization beam combiner for combining the modulated first and second carrier lightwaves which generates a polarization multiplexing optical signal; second and third lasers for providing second and third lightwaves whose wavelengths are one of both longer than that of the first lightwave and shorter than that of the first lightwave, a second optical coupler that is polarization maintaining for combining the second and third lightwaves; and a third optical coupler for combining the modulated first and second carrier lightwaves from the polarization beam combiner and the combined second and third lightwaves out of the second optical coupler for transmission over an optical medium.

5 Claims, 1 Drawing Sheet

ALL-OPTICAL WAVELENGTH CONVERSION FOR A POLARIZATION MULTIPLEXING OPTICAL SIGNAL

This application claims the benefit of U.S. Provisional Application No. 60/051,550, entitled "Wavelength Conversion for 100-Gbps Polarization Multiplexing Phase Modulated Signal based on Dual-Pump Four-Wave Mixing", filed on May 8, 2008, the contents of which is incorporated by reference herein.

The present invention relates generally to optical communications, and more particularly, to an all-optical wavelength conversion for a polarization multiplexing optical signal.

BACKGROUND OF THE INVENTION

For future high-speed optical networks, there is a strong demand for realizing an all-optical wavelength conversion (WC) operation without the necessity of multiple optical-electronic-optical (O-E-O) transponders and that enhances network properties like reconfigurability, non-blocking capability and wavelength reuse. Several methods for all-optical WC have been proposed based on self-phase modulation (SPM), cross-phase modulation (XPM), and cross-gain modulation (XGM). However, four-wave mixing (FWM) is one of the most promising schemes to achieve wavelength conversion, because it is fully transparent to the signal bit rate and modulation format. FWM based wavelength conversion can be accomplished in the semiconductor optical amplifier (SOA) or optical fiber, however, the transmission speed in the SOA is limited due to the response time of the carriers.

High speed all-optical WC can be realized by using single pump and multi-pumps in a nonlinear fiber, specially, high-nonlinear fiber (HNLF). In single pump scheme, the conversion is usually polarization sensitive, and the converted spectrum is inverted relative to that of the original signal. Recently, the coherent detection has been proposed to be a promising way to increase the spectral efficiency and to compensate for optical transmission impairments in the electrical domain. With digital coherent detection, PolMux-RZ-QPSK is shown to be a promising modulation format for 100-Gb/s high-speed transmissions due to its high spectral efficiency as well its tolerance toward chromatic dispersion (CD) and polarization-mode dispersion (PMD). Additionally, comparison to binary modulation formats, the spectral efficiency of octaphase shift keying (8-PSK) can be increased 6-fold with polarization multiplexing, and it is more feasible for the applications of digital signal processing because of the reduce baud rate. However, no wavelength conversion has been demonstrated for any polarization multiplexing signal.

Accordingly, there is a need for an all-optical wavelength conversion for a polarization multiplexing optical signal

SUMMARY OF THE INVENTION

In accordance with the invention, an apparatus includes a first laser source for providing a first lightwave; a first optical coupler that is polarization maintaining for dividing the first lightwave into first and second optical carrier lightwaves; first and second modulators for modulating respective ones of the first and second carrier lightwaves with information; a polarization beam combiner for combining the modulated first and second carrier lightwaves and generating a polarization multiplexing optical signal; second and third lasers for providing second and third lightwaves whose wavelengths are one of both longer than that of the first lightwave and shorter than that of the first lightwave; a second optical coupler that is polarization maintaining for combining the second and third lightwaves; a third optical coupler for combining the modulated first and second carrier lightwaves from the polarization beam combiner and the generated polarization multiplexing optical signal for transmission over an optical medium.

BRIEF DESCRIPTION OF DRAWINGS

These and other advantages of the invention will be apparent to those of ordinary skill in the art by reference to the following detailed description and the accompanying drawings.

DETAILED DESCRIPTION

Figure 1:
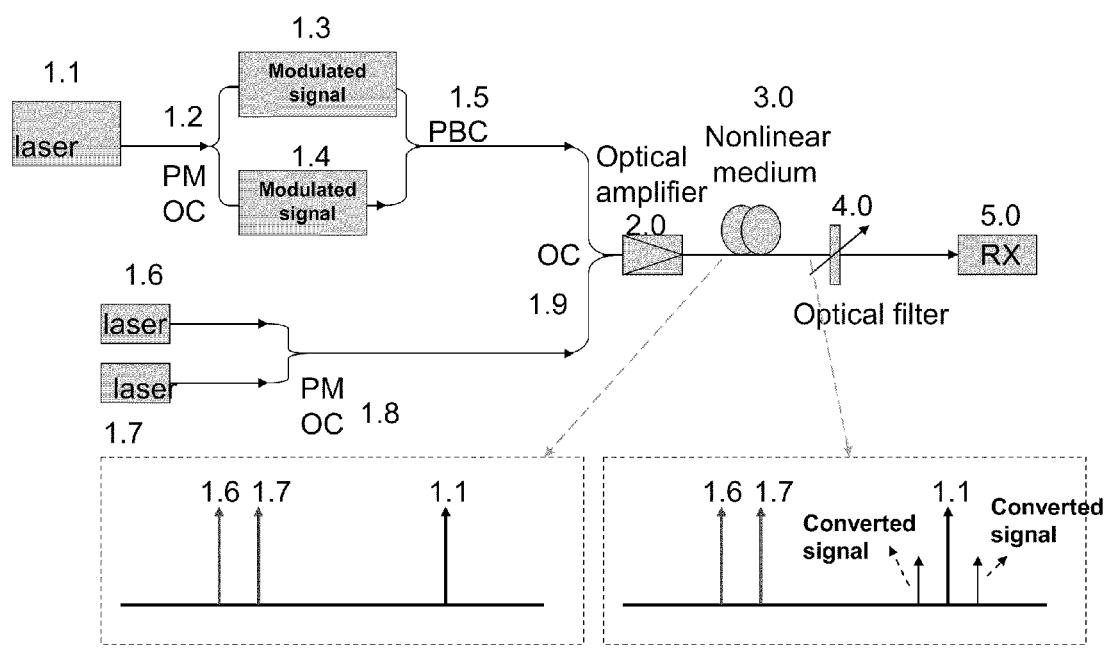
FIG. 1 is a diagram of an exemplary optical system in which the inventive wavelength conversion for polarization multiplexing signals can be employed, accompanied by waveforms showing the optical signal conversion.

The inventive method provides an all-optical wavelength conversion for polarization multiplexing signals with polarization insensitivity. An exemplary optical system for carrying out the inventive wavelength conversion is shown in FIG. 1.

A laser 1.1 provides a lightwave carrier which is split by a first polarization maintaining optical maintaining coupler 1.2 through two signal modulators 1.3, 1.4 and then recombined at a polarization beam coupler PBC 1.5. The modulated lightwave carriers out of the PBC 1.5 are optically coupled 1.9 with two light wave from pump lasers 1.6, 1.7 that polarization maintaining optically coupled 1.8

The modulated carrier and pump laser sources 1.1, 1.6, 1.7 are optically amplified 2.9, transmitted over a nonlinear medium 3.0. optically filtered 4.0 to extract the converted signal about the optical carrier 1.1 for input to a receiver RX 5.0.

Each of the 3 light sources 1.1, 1.6, 1.7 can be any one of a light emitting diode LED, distributed feedback laser diode DFB-LD, Fabry-Perot laser diode FP-LD or tunable external laser. The LED is the cheapest of light sources with a very wide spectrum but is suitable only for smaller than 1 km transmission. The DFB-LD light source has a narrow line width and suitable for long distance transmission, but expensive. The FP-LD is cheaper, suitable for smaller than 10 km transmission distances, but has a wide line width. The tunable external laser source has a narrow line width and low phase noise, but is expensive. However, the tunable external laser source is preferred for coherent detection in a high transmission speed system.

Modulators 1.3, 1.4 can be either a phase modulator or intensity modulator. The phase modulators are employed to generate a DPSK signal, DQPSK signal, multiphase signal or a modulated signal. Use of the phase modulator allows for constant power and is easy for re-modulation, however, a delay line interferometer or coherent detection is required at the receiver side so it is more expensive. The intensity modulator is employed to generate a DPSK signal here proper DC bias is employed, an OOK signal or multilevel intensity modulated signal. Use of the intensity modulator allows for intensity fluctuation, easy for direct detection and is lower cost.

The polarization maintaining optical coupler PM-OC 1.2 divides the lightwave optical carrier power into two parts and maintains the polarization direction. It can be replaced by two lasers with polarization maintaining output. The polarization beam combiner PBC 1.5 makes sure that the polarization direction of the signals from the modulators is orthogonal to the fiber. The PBC 1.5 generates the polarization multiplexing signal. The polarization maintaining optical coupler PM-OC 1.8 makes sure that the polarization from the pump lasers 1.6 and 1.7 has the same direction. The optical coupler OC 1.9 combines the modulated signal out of the PBC 1.5 and the light sources from the pump lasers 1.6, 1.7. The optical amplifier 2.0 can be an erbium doped amplifier or a semiconductor optical amplifier. The erbium doped amplifier provides high power and gain, is large in size and only works at 1530-1620 wavelengths. The semiconductor optical amplifier has a small power and gain and is small in size, but can work at any wavelength.

The nonlinear transmission medium 3.0 is preferably a high nonlinear fiber, but can also be a semiconductor amplifier or a nonlinear waveguide. The optical filter 4.0 can be a tunable multi-cavity optical filter, wavelength-division multiplexing WDM filter, an arrayed waveguide grating, optical fiber Bragg grating or optical interleaver. The optical receiver can be either direct detection or coherent detection based. Direct detection is used in a standard receiver for polarization multiplexing signal where polarization de-multiplexing techniques are needed. Coherent detection is used in a standard receiver for a polarization multiplexing signal.

Referring again to the optical system of diagram of FIG. 1, the laser source 1.1 provides a carrier laser for carrying a polarization multiplexing signal. The secondary lasers 1.6 and 1.7 are used to provide pump signals. For a high-speed coherent detection system, the laser should have a line-width smaller than 100 kHz, and it is preferable if the laser wavelength is tunable. The lightwave from the laser source 1.1 is divided into two parts by a polarization maintaining optical coupler (PM-OC, 1.2). The coupler 1.2 and laser 1.1 are connected by polarization maintaining PM fiber. It is possible to use two identical lasers with same wavelength and the same optical power to replace the secondary lasers 1.1 and 1.2.

Each of the divided parts from the PM-OC with modulators 1.3 or 1.4 by a polarization maintaining PM fiber. The modulators 1.3 and 1.4 are employed to realize an electrical signal to optical signal conversion. The modulation format by the modulators in 1.3 and 1.4 can be regular on-off keying intensity modulation, phase modulation including any level phase modulation such as QPSK, 8PSK or 16PSK. The intensity modulation can also be multilevel such as 8 QAM, 16 QAM, 32 QAM or higher. After the modulators 1.3 and 1.4, the two modulated optical signals are combined by a polarization beam coupler (PBC, 1.5).

The polarization direction of the signals out of the modulators 1.3 and 1.4 will be orthogonal and then combined by the PBC 1.5. The pump signals from the secondary lasers 1.6 and 1.7 are combined by a polarization maintaining optical coupler (PM OC, 1.8). Alternatively, without the PM-OC 1.8, we can use a polarization controller to adjust the polarization direction to get the same polarization direction for pump signals 1.6 and 1.7 after the regular optical coupler in the fiber. Then the signal from the PM-OC 1.8 and the PBC 1.5 are combined by an optical coupler (OC, 1.9). The wavelength of the pump signals 1.6 and 1.7 should be the same side along with the optical carrier from laser source 1.1. This means that the wavelength of the pump signals 1.6 and 1.7 should be both longer than that of the optical carrier 1.1 or shorter than that of the optical carrier 1.1 as shown in the waveforms of FIG. 1. And the generated four wave mixing optical signal should be longer or shorter than that of 1.1.

One optical amplifier (2.0) is used to boost the optical signal to generate enough nonlinear effect in nonlinear transmission medium (3.0). The amplifier 2.0 can be any optical amplifier, such as an erbium doped amplifier or a semiconductor optical amplifier. The transmission medium 3.0 can be a nonlinear optical fiber, or other nonlinear medium to generate a four wave mixing. A high-nonlinear fiber is preferred due to its low dispersion slope and high nonlinear coefficient. Then an optical filter 4.0 is used to isolate the converted signal. A receiver 5.0 is used to realize an optical-to-electrical conversion. For high speed polarization multiplexing phase modulated signal, coherent detection is preferred.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. An apparatus comprising:
   a first laser source for providing a first lightwave;
   a first optical coupler that is polarization maintaining for dividing the first lightwave into first and second optical carrier lightwaves;
   first and second modulators for modulating respective ones of the first and second carrier lightwaves with information;
   a polarization beam combiner for combining the modulated first and second carrier lightwaves and generating a polarization multiplexing optical signal, said polarization beam combiner assuring that the combined modulated first and second lightwaves are orthogonal to an optical fiber;
   second and third lasers for providing second and third lightwaves whose wavelengths are one of both longer than that of the first lightwave and shorter than that of the first lightwave;
   a second optical coupler that is polarization maintaining for combining the second and third lightwaves, said second optical coupler assuring that the second and third lightwaves have the same direction;
   a third optical coupler for combining the modulated first and second carrier lightwaves from the polarization beam combiner and the generated polarization multiplexing optical signal for transmission over an optical medium.

2. The apparatus of claim 1, further comprising an amplifier for amplifying the combined modulated carrier lightwaves and the second and third lightwaves.

3. The apparatus of claim 2, further comprising a nonlinear optical transmission medium over which the output from the amplifier is transmitted 4. The apparatus of claim 3, further comprising an optical filter for isolating converted first and second modulated carrier lightwaves from the combined lightwaves from the third optical coupler.

5. The apparatus of claim 1, wherein the second optical coupler is replaced with a polarization controller to adjust polarization direction to get the same polarization direction for the second and third lightwaves after optical coupling of the second and third lightwaves from a fiber optic path.

\* \* \* \* \*